(12) United States Patent
Ma et al.

(10) Patent No.: US 11,022,838 B2
(45) Date of Patent: Jun. 1, 2021

(54) POLARIZING PLATE AND LIQUID CRYSTAL DISPLAY DEVICE

(71) Applicant: Wuhan China Star Optoelectronics Technology Co., Ltd., Wuhan (CN)

(72) Inventors: Guizhi Ma, Wuhan (CN); Yongkai Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 91 days.

(21) Appl. No.: 16/464,693

(22) PCT Filed: Jan. 3, 2019

(86) PCT No.: PCT/CN2019/070312
§ 371 (c)(1),
(2) Date: May 29, 2019

(87) PCT Pub. No.: WO2020/087775
PCT Pub. Date: May 7, 2020

(65) Prior Publication Data
US 2020/0301199 A1    Sep. 24, 2020

(30) Foreign Application Priority Data
Oct. 30, 2018   (CN) .......................... 201811279239.1

(51) Int. Cl.
*G02F 1/1335* (2006.01)
*G02B 5/30* (2006.01)

(52) U.S. Cl.
CPC .. *G02F 1/133528* (2013.01); *G02F 1/133509* (2013.01); *G02B 5/3025* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 2013/0286496 A1* | 10/2013 | Nakamura | G02B 5/201 359/891 |
| 2019/0285933 A1* | 9/2019 | Chien | G02F 1/133528 |
| 2020/0301199 A1* | 9/2020 | Ma | G02F 1/133509 |

OTHER PUBLICATIONS

Translation of CN207780298 (Year: 2020).*

* cited by examiner

*Primary Examiner* — Phu Vu

(57) ABSTRACT

A polarizing plate and a liquid crystal display device are provided. The polarizing plate includes a polarizing layer, a short wavelength band blue light film, a supporting layer, a release film, and a protective film. The short wavelength band blue light film is disposed on an upper side or a lower side of the polarizing layer. The supporting layer is disposed on a side of the polarizing layer opposite another side of the pluralizing layer facing the short wavelength band blue light film. The release film is disposed on a lower side of the polarizing layer. The release film is connected to the polarizing layer or the short wavelength band blue light film through an adhesive layer.

20 Claims, 5 Drawing Sheets

POLARIZING PLATE AND LIQUID CRYSTAL DISPLAY DEVICE

RELATED APPLICATIONS

This application is a National Phase of PCT Patent Application No. PCT/CN2019/070312 having International filing date of Jan. 3, 2019, which claims the benefit of priority of Chinese Patent Application No. 201811279239.1 filed on Oct. 30, 2018. The contents of the above applications are all incorporated by reference as if fully set forth herein in their entirety.

FIELD AND BACKGROUND OF THE INVENTION

The present disclosure relates to liquid crystal display technologies, and more particularly, to a polarizing plate, and a liquid crystal display device.

With rapid development of electronic technologies and display technologies, liquid crystal displays (LCDs) have been widely used in, such as LCD TVs, smart phones, computers, tablets, and other modern information equipment. Most liquid crystal display devices on the market are backlight type liquid crystal display devices, which include a liquid crystal display panel and a backlight module (BLU).

The liquid crystal display panel is usually composed of a color filter (CF) substrate, a thin film transistor (TFT) array substrate, and a liquid crystal layer (LCL) disposed between these two substrates. A polarizing plate is attached to a side of the CF substrate opposite another side of the CF substrate facing the liquid crystal layer. Another polarizing plate is attached to a side of the TFT array substrate opposite another side of the TFT array substrate facing the liquid crystal layer. The liquid crystal display panel controls the orientation of the liquid crystal molecules by the electric field, changes a polarization state of light, and realizes penetration and blocking of an optical path by the polarizing plate, thereby achieving the purpose of display. The backlight module usually uses a light emitting diode (LED) as a backlight source.

Blue light is abundant in computer screens, fluorescent lamps, smart phone screens, digital product displays, LED lightings, etc. Blue light refers to high-energy light with wavelength from 380 to 480 nm, which is short wavelength and high energy. In particular, short-wavelength band blue light having wavelength less than 455 nm causes an increasing amount of toxin in the macular of eyes, which seriously threatens people's eye health. Blue light can be seen everywhere in daily life, but LED liquid crystal display devices are a main source of harmful blue light that people are exposed to.

Liquid crystal display devices, in the current market, generally use LEDs as backlights. Because the backlight requires a white light effect, the industry uses a blue LED mixing with yellow phosphor to form white light. The blue LED is a main hardware, and a blue spectrum in the white light has a wave peak, which forms what we call harmful blue light. LED LCD TVs are main entertainment mediums in living rooms. Most families choose to watch TV at night before going to bed, and more than this, many people will turn off lightings when watching TV. Those circumstances together with splash screens and other factors cause harmful blue light to damage the eyes. Long-term accumulation causes eye fatigue, dryness, and decreased vision. It is also easy to stimulate brown pigmentation and causing skin to grow yellow spots and freckles. Because harm of blue light to the eyes is accumulated over a long period, the damage caused by the blue light of the TV to the eyes should be paid enough attention, especially for young children.

At present, commonly methods of eye protection from short-wavelength band blue light are roughly classified into the following categories:

The first way is to reduce transmission of blue light by adding a film on a surface of the display device. That is something like a common eye protection anti-blue light film on the market. It acts as a blue light barrier by being attached to the display device. However, this method is costly and needs to be purchased by consumers. At the same time, the method will make picture effect worse, that is, pictures look yellowish. In addition, the method will reduce display brightness.

The second way is to adjust by a mobile phone software, that is, by adjusting luminous efficiency of a backlight LED to reduce overall brightness of the blue light, and thereby reducing brightness of the short wavelength band blue light, which has a wavelength less than 455 nm. It is also an anti-blue light mode for eye-protection currently used on mobile phones. This way does not require additional cost compared to the first way. However, elimination effect of the short wavelength band blue light with a wavelength less than 455 nm is not remarkable. At the same time, there is still a problem that the picture looks yellowish.

Therefore, for common existing short wavelength band blue light with a wavelength less than 455 nm of the current liquid crystal display devices, it causes irreversible damage to eyes of users, especially to the eyes of children and adolescents. The method of eye protection from short wavelength band blue light currently generally has a problem of distortion of picture colors. How to reduce harmful blue light without affecting display effect is an urgent issue to be solved in the development of liquid crystal display technologies.

SUMMARY OF THE INVENTION

In view of the above, the present disclosure provides a polarizing plate, and a liquid crystal display device to solve a current situation that common existing short wavelength band blue light with a wavelength less than 455 nm of a current liquid crystal display devices, which causes irreversible damage to eyes of user, especially to eyes of children and adolescents, and solve an issue that a method of eye protection from band blue light currently has a problem of distortion of picture colors generally. The disclosure provides a solution with reduced harmful blue light and at the same time insures display effect without distortion.

In order to achieve above-mentioned object of the present disclosure, one embodiment of the disclosure provides polarizing plate. The polarizing plate includes a polarizing layer, a short wavelength band blue light film, a supporting layer, a release film, and a protective film. A material of the polarizing layer is polyvinyl alcohol or cross-linked polyvinyl alcohol microspheres. The short wavelength band blue light film is disposed directly on or disposed directly under the polarizing layer. The short wavelength band blue light is defined as a blue light having a wavelength less than 455 nm. The supporting layer is disposed on a side of the polarizing layer away from the short wavelength band blue light film. A material of the supporting layer is a tri-acetic acid cellulose or a cyclo olefin polymers. The release film is disposed under the polarizing layer. The release film is bonded to the polarizing layer or the short wavelength band blue light film through an adhesive layer. A material of the adhesive layer is a pressure sensitive adhesive. The protective film is disposed above the polarizing layer.

Furthermore, another embodiment of the disclosure provides a polarizing plate. The polarizing plate includes a polarizing layer, a short wavelength band blue light film, a release film, and a protective film. The short wavelength band blue light film is disposed directly on or disposed directly under the polarizing layer. The short wavelength band blue light is defined as a blue light having a wavelength less than 455 nm. The release film is disposed under the polarizing layer. The release film is bonded to the polarizing layer or the short wavelength band blue light film through an adhesive layer. The protective film is disposed above the polarizing layer.

Furthermore, another embodiment of the disclosure provides a liquid crystal display device. The liquid crystal display device includes a liquid crystal display panel and a backlight module. The liquid crystal display panel includes an array substrate, a color filter substrate, and a liquid crystal layer disposed between the array substrate and the color filter substrate. The backlight module is disposed on a side of the array substrate away from the liquid crystal layer. The liquid crystal display device further includes a first polarizing plate, and a second polarizing plate. The first polarizing plate is disposed on a side of the color filter substrate away from the liquid crystal layer. The second polarizing plate is disposed between the array substrate and the backlight module. At least one of the first polarizing plate and the second polarizing plate includes a polarizing layer, a short wavelength band blue light film, a release film, and a protective film. The short wavelength band blue light film is disposed directly on or disposed directly under the polarizing layer. A short wavelength band blue light is defined as a blue light having a wavelength less than 455 nm. The release film is disposed under the polarizing layer. The release film is bonded to the polarizing layer or the short wavelength band blue light film through an adhesive layer. The protective film is disposed above the polarizing layer.

In comparison with the prior art, solutions of the disclosure ensure that harmful wavelength blue light is filtered to a degree about 50% to reduce blue light damage by adjusting the polarizing plate structure and replacing the supporting layer with the short wavelength band blue film without adding another film. It realizes eye protection effect from short wavelength band blue light. Compared with other solution with an external anti-blue-ray glass, the polarizing plate of the invention effectively reduces a proportion of the short wavelength band blue light in blue light band, and also effectively reduces the influence on an overall thickness of the polarizing plate. It has no obvious influence on light transmission of other wavelength bands, and avoids decreasing of transmittance. It can greatly guarantee the display effect and avoid issues of display distortion. At the same time, compared with most of the current short wavelength band blue light products, the polarizing plate of the invention allows effective control of cost, has more usability, and is advantageous to product promotion.

DETAILED DESCRIPTION OF PREFERRED EMBODIMENTS

The following description of the embodiments is provided by reference to the following drawings and illustrates the specific embodiments of the present disclosure. Directional terms mentioned in the present disclosure, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

One embodiment of the present invention provides a polarizing plate. The polarizing plate includes a polarizing layer, a short wavelength band blue light film, a release film, and a protective film. The short wavelength band blue light film is disposed directly on or disposed directly under the polarizing layer. The release film is disposed under the polarizing layer. The release film is bonded to the polarizing layer or the short wavelength band blue light film through an adhesive layer. The protective film is disposed above the polarizing layer. The short wavelength band blue light is defined as a blue light having a wavelength less than 455 nm. Because the short-wavelength band blue light having wavelength less than 455 nm causes increasing amount of toxin in the macular of eyes, which seriously threatens people's eye health, it is important to protect eyes from blue light within that wavelength band.

The polarizing plate of the present invention ensures that harmful wavelength blue light is filtered to a degree about 50% to reduce blue light damage by adjusting a polarizing plate structure and replacing a supporting layer (cyclo olefin polymers, COPs, tri-acetic acid cellulose, TAC, polymethyl methacrylate, PMMA, or etc.) with the short wavelength band blue film without adding another film. It realizes eye protection effect from the short wavelength band blue light. Compared with other solution with an external anti-blue-ray glass, the polarizing plate of the present invention effectively reduces a proportion of the short wavelength band blue light in blue light band, and also effectively reduces influence on an overall thickness of the polarizing plate. It has no obvious influence on light transmission of other wavelength bands, and avoids decreasing of transmittance. It can greatly guarantee the display effect and avoid issues of display distortion. At the same time, compared with most of the current short wavelength band blue light products, the polarizing plate of the present invention allows effective control of cost, has more usability, and is advantageous to product promotion.

Figure 1:
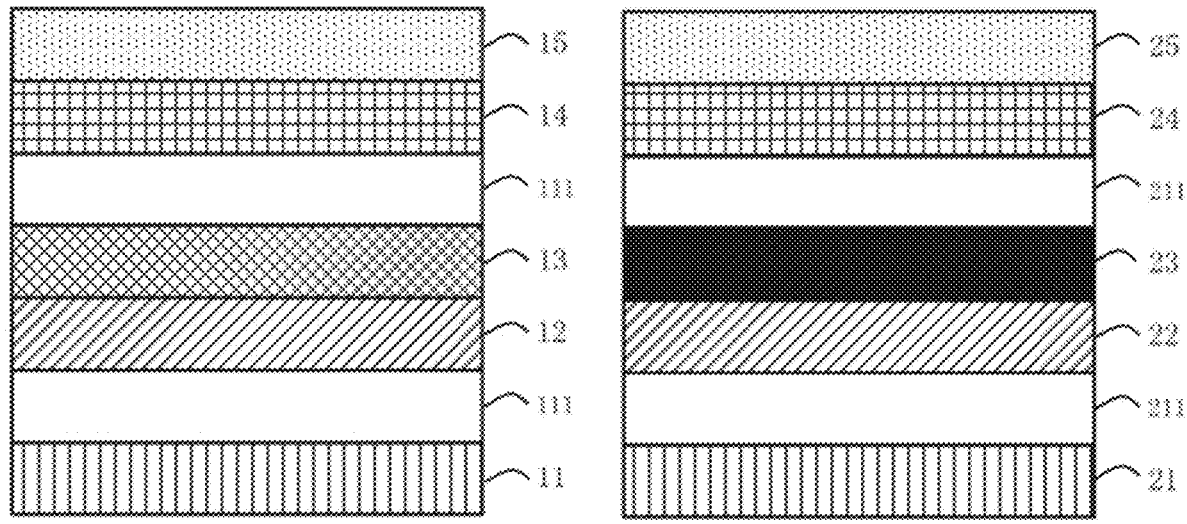
FIG. 1 is a schematic view of a laminated structure of a polarizing plate according to a first embodiment of the present disclosure.

Referring to FIG. 1, FIG. 1 is a schematic view of a laminated structure of a polarizing plate according to a first embodiment of the present invention. The left side of FIG. 1 is a schematic view of a laminated structure of the polarizing plate of the present invention, and the right side of FIG. 1 is a schematic view of a laminated structure of the prior art polarizing plate for comparing. The polarizing plate in the embodiment includes a release film 11, a polarizing layer 12, a short wavelength band blue light film 13, an advanced polarizer film (APF) 14, and a protective film 15 stacked in order.

The release film 11 is disposed under the polarizing layer 12. The release film 11 is bonded to the polarizing layer 12 through an adhesive layer 111 for isolating the polarizing layer 12 from external environment. When the short wavelength band blue light film 13 is disposed directly on the polarizing layer 12, the release film 11 is bonded to the polarizing layer 12 through an adhesive layer 111. The release film refers to a film with selectively viscous on the surface of the film. The release film has slight stickiness or does not have stickiness after contact with a particular material under some conditions. Material of the adhesive layer 111 is pressure sensitive adhesives (PSAs).

The polarizing layer 12 is configured to polarize the incident light and then emitting. Material of the polarizing layer is polyvinyl alcohol (PVA) or cross-linked polyvinyl alcohol microspheres (PVA-Ms).

The short wavelength band blue light film 13 is disposed directly on the polarizing layer 12 to filter blue light with harmful wavelength less than 455 nm to reduces the proportion of the short wavelength band blue light in blue light band. The embodiment realizes eye protection effect from short wavelength band blue light by adjusting the polarizing plate structure without adding another film. The short wavelength band blue film 13 can use a low blue light film produced by Japan Toray Co., Ltd., or a low blue light film produced by China Jinzhang Technology, which can reduce harmful blue light by 10 to 50% without notable impact on transmitting light of other wavelength bands.

The advanced polarizer film 14 is disposed under the protective film 15. The advanced polarizer film 14 is bonded to the short wavelength band blue light film 13 through the adhesive layer 111. When the short wavelength band blue light film 13 is disposed directly the polarizing layer 12, the advanced polarizer film 14 is bonded to the short wavelength band blue light film 13 through the adhesive layer 111. The advanced polarizer film enhances the reflected light following a principle of constructive interference of reflected light on the upper and lower surfaces of the film. A multilayered film is usually used to produce the APF. Material of the adhesive layer 111 is PSAs.

The protective film 15 is disposed on the upper side of the polarizing layer 12. In detail, the protective film 15 is disposed on the upper side of the polarizing layer 12 in this embodiment. The protective film has wear resistance, scratch resistance, and anti-reflective effect.

For comparing, a prior art polarizing plate includes a release film 21, a polarizing layer 22, a first supporting layer 23, an advanced polarizer film 24, and a protective film 25 stacked in order. The release film 21 is connected to the polarizing layer 22 through an adhesive layer 211. The first supporting layer 23 is connected to the advanced polarizer film 24 through the adhesive layer 211. The polarizing plate of the embodiment reduces blue light damage by adjusting the polarizing plate structure and replacing the first supporting layer 23 in prior art polarizing plate with the short wavelength band blue film 13 without adding another film. It realizes eye protection effect from short wavelength band blue light. Compared with other solution with an external anti-blue-ray glass, the polarizing plate of the invention effectively reduces the influence on the overall thickness of the polarizing plate. It has no obvious influence on the light transmission of other wavelength bands, and avoids decreasing of transmittance. It can greatly guarantee the display effect and avoid issues of display distortion. At the same time, compared with most of the current short wavelength band blue light products, the polarizing plate of the invention allows effective control of cost, has more usability, and is advantageous to product promotion.

Figure 2:
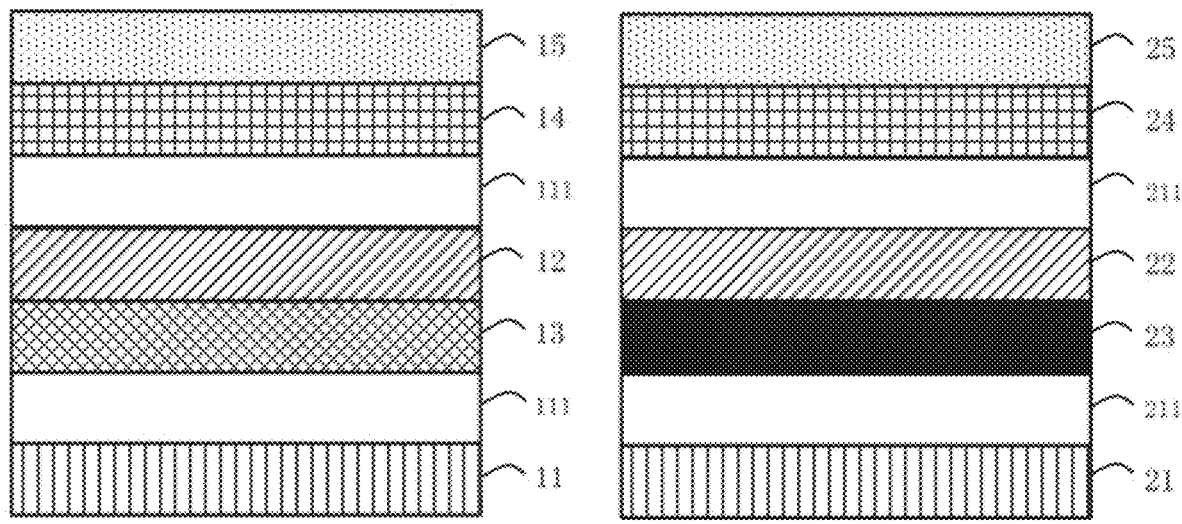
FIG. 2 is a schematic view of a laminated structure of a polarizing plate according to a second embodiment of the disclosure.

Referring to FIG. 2, FIG. 2 is a schematic view of a laminated structure of a polarizing plate according to a second embodiment of the invention. The left side of FIG. 2 is a schematic view of a laminated structure of the polarizing plate of the present invention, and the right side of FIG. 2 is a schematic view of a laminated structure of the prior art polarizing plate for comparing. The difference from the first embodiment shown in FIG. 1 is that, in the embodiment, the short wavelength band blue light film 13 is disposed directly under the polarizing layer. The polarizing plate in the embodiment includes a release film 11, a short wavelength band blue light film 13, a polarizing layer 12, an advanced polarizer film 14, and a protective film 15 stacked in order.

The release film 11 is disposed under a short wavelength band blue light film 13. The release film 11 is bonded to the short wavelength band blue light film 13 through an adhesive layer 111 for isolating the polarizing layer 12 from external environment. When the short wavelength band blue light film 13 is disposed directly under the polarizing layer 12, the release film 11 is bonded to the short wavelength band blue light film 13 through an adhesive layer 111. Material of the adhesive layer 111 is PSAs.

The short wavelength band blue light film 13 is disposed directly under the polarizing layer 12 to filter blue light with harmful wavelength less than 455 nm to reduces the proportion of the short wavelength band blue light in blue light band. The embodiment realizes eye protection effect from short wavelength band blue light by adjusting the polarizing plate structure without adding another film.

The polarizing layer 12 is configured to polarize the incident light and then emitting. Material of the polarizing layer is PVA or PVA-Ms.

The advanced polarizer film 14 is disposed under the protective film 15. The advanced polarizer film 14 is bonded to the polarizing layer 12 through the adhesive layer 111. When the short wavelength band blue light film 13 is disposed directly under the polarizing layer 12, the advanced polarizer film 14 is bonded to the polarizing layer 12 through the adhesive layer 111. A multilayered film is usually used to produce the APF. Material of the adhesive layer 111 is PSAs.

The protective film 15 is disposed on the upper side of the polarizing layer 12. In detail, the protective film 15 is disposed on the upper side of the advanced polarizer film 14 in this embodiment. The protective film has wear resistance, scratch resistance, and anti-reflective effect.

For comparing, a prior art polarizing plate includes a release film 21, a first supporting layer 23, a polarizing layer 22, an advanced polarizer film 24, and a protective film 25 stacked in order. The release film 21 is connected to the first supporting layer 23 through an adhesive layer 211. The first supporting layer 23 is connected to the release film 21 through the adhesive layer 211. The polarizing plate of the embodiment reduces blue light damage by adjusting the polarizing plate structure and replacing the first supporting layer 23 in prior art polarizing plate with the short wavelength band blue film 13 without adding another film. It realizes eye protection effect from short wavelength band blue light. Compared with other solution with an external anti-blue-ray glass, the polarizing plate of the invention effectively reduces the influence on the overall thickness of the polarizing plate. It has no obvious influence on the light transmission of other wavelength bands, and avoids decreasing of transmittance. It can greatly guarantee the display effect and avoid issue of display distortion. At the same time, compared with most of the current short wavelength band blue light products, the polarizing plate of the invention allows effective control of cost, has more usability, and is advantageous to product promotion.

Figure 3:
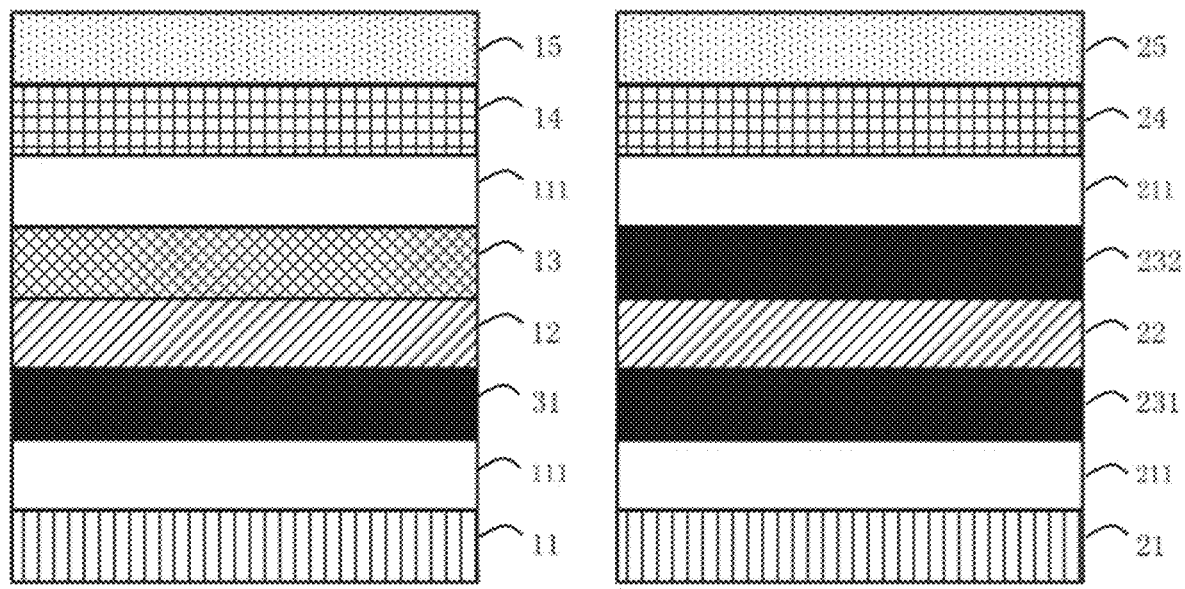
FIG. 3 is a schematic view of a laminated structure of a polarizing plate according to a third embodiment of the disclosure.

Referring to FIG. 3, FIG. 3 is a schematic view of a laminated structure of a polarizing plate according to a third embodiment of the invention. The left side of FIG. 3 is a schematic view of a laminated structure of the polarizing plate of the present invention, and the right side of FIG. 3 is a schematic view of a laminated structure of the prior art polarizing plate for comparing. The difference from the first embodiment shown in FIG. 1 is that, in the embodiment, there provides a supporting layer 31 disposed on the lower side of the polarizing layer. The polarizing plate in the embodiment includes a release film 11, a supporting layer 31, a polarizing layer 12, a short wavelength band blue light film 13, an advanced polarizer film 14, and a protective film 15 stacked in order.

The release film 11 is disposed under the supporting layer 31. The release film 11 is connected to the supporting layer 31 through an adhesive layer 111 for isolating the polarizing layer 12 from external environment. When the supporting layer 31 is disposed on a lower side of the polarizing layer 12, the release film 11 is connected to the supporting layer 31 through the adhesive layer 111. Material of the adhesive layer 111 is PSAs.

The supporting layer 31 is disposed on a lower side of the polarizing layer 12 for isolating the polarizing layer 12 from water and gas to protect the polarizing layer 12. Material of the supporting layer 31 is TAC, COP, PMMA, or etc.

The polarizing layer 12 is configured to polarize the incident light and then emitting. Material of the polarizing layer is PVA or PVA-Ms.

The short wavelength band blue light film 13 is disposed directly on the polarizing layer 12 to filter blue light with harmful wavelength less than 455 nm to reduces the proportion of the short wavelength band blue light in blue light band. The embodiment realizes eye protection effect from short wavelength band blue light by adjusting the polarizing plate structure without adding another film.

The advanced polarizer film 14 is disposed under the protective film 15. The advanced polarizer film 14 is bonded to the short wavelength band blue light film 13 through the adhesive layer 111. When the short wavelength band blue light film 13 is disposed directly on the polarizing layer 12, the advanced polarizer film 14 is bonded to the short wavelength band blue light film 13 through the adhesive layer 111. A multilayered film is usually used to produce the APF. Material of the adhesive layer 111 is PSAs.

The protective film 15 is disposed on the upper side of the polarizing layer 12. In detail, the protective film 15 is disposed on the upper side of the advanced polarizer film 14 in this embodiment. The protective film has wear resistance, scratch resistance, and anti-reflective effect.

For comparing, a prior art polarizing plate includes a release film 21, a first supporting layer 231, a polarizing layer 22, a second supporting layer 232, an advanced polarizer film 24, and a protective film 25 stacked in order. The release film 21 is connected to the first supporting layer 231 through an adhesive layer 211. The second supporting layer 232 is connected to the advanced polarizer film 24 through the adhesive layer 211. The polarizing plate of the embodiment reduces blue light damage by adjusting the polarizing plate structure and replacing the second supporting layer 232 above the polarizing layer 22 in prior art polarizing plate with the short wavelength band blue film 13 without adding another film. It realizes eye protection effect from short wavelength band blue light. Compared with other solution with an external anti-blue-ray glass, the polarizing plate of the invention effectively reduces the influence on the overall thickness of the polarizing plate. It has no obvious influence on the light transmission of other wavelength bands, and avoids decreasing of transmittance. It can greatly guarantee the display effect and avoid issues of display distortion. At the same time, compared with most of the current short wavelength band blue light products, the polarizing plate of the invention allows effective control of cost, has more usability, and is advantageous to product promotion.

Figure 4:
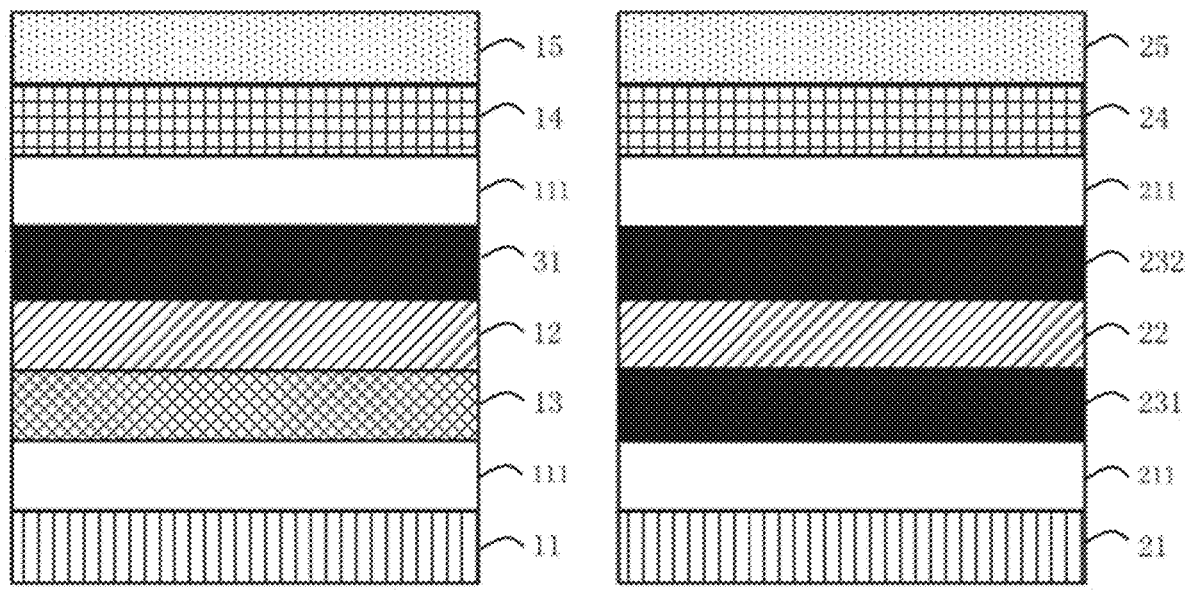
FIG. 4 is a schematic view of a laminated structure of a polarizing plate according to a fourth embodiment of the disclosure.

Referring to FIG. 4, FIG. 4 is a schematic view of a laminated structure of a polarizing plate according to a fourth embodiment of the invention. The left side of FIG. 4 is a schematic view of a laminated structure of the polarizing plate of the present invention, and the right side of FIG. 4 is a schematic view of a laminated structure of the prior art polarizing plate for comparing. The difference from the third embodiment shown in FIG. 3 is that, in the embodiment, there provides a short wavelength band blue light film 13 disposed directly under the polarizing layer, and a supporting layer 31 disposed on the polarizing layer. The polarizing plate in the embodiment includes a release film 11, a short wavelength band blue light film 13, a polarizing layer 12, a supporting layer 31, an advanced polarizer film 14, and a protective film 15 stacked in order.

The release film 11 is disposed under the short wavelength band blue light film 13. The release film 11 is bonded to the short wavelength band blue light film 13 through an adhesive layer 111 for isolating the polarizing layer 12 from external environment. When the short wavelength band blue light film 13 is disposed directly under the polarizing layer 12, the release film 11 is bonded to the short wavelength band blue light film 13 through an adhesive layer 111. Material of the adhesive layer 111 is PSAs.

The short wavelength band blue light film 13 is disposed directly under the polarizing layer 12 to filter blue light with harmful wavelength less than 455 nm to reduces the proportion of the short wavelength band blue light in blue light band. The embodiment realizes eye protection effect from short wavelength band blue light by adjusting the polarizing plate structure without adding another film.

The polarizing layer 12 is configured to polarize the incident light and then emitting. Material of the polarizing layer is PVA or PVA-Ms.

The supporting layer 31 is disposed on an upper side of the polarizing layer 12 for isolating the polarizing layer 12 from water and gas to protect the polarizing layer 12. Material of the supporting layer 31 is TAC, COP, PMMA, or etc.

The advanced polarizer film 14 disposed on a lower side of the protective film 15. The advanced polarizer film 14 is connected to the supporting layer 31 through the adhesive layer 111. When the supporting layer 31 is disposed on an upper side of the polarizing layer 12, the advanced polarizer film 14 is connected to the supporting layer 31 through the adhesive layer 111. A multilayered film is usually used to produce the APF. Material of the adhesive layer 111 is PSAs.

The protective film 15 is disposed on the upper side of the polarizing layer 12. In detail, the protective film 15 is disposed on the upper side of the advanced polarizer film 14 in this embodiment. The protective film has wear resistance, scratch resistance and anti-reflective effect.

For comparing, a prior art polarizing plate includes a release film 21, a first supporting layer 231, a polarizing layer 22, a second supporting layer 232, an advanced polarizer film 24, and a protective film 25 stacked in order. The release film 21 is connected to the first supporting layer 231 through an adhesive layer 211. The second supporting layer 232 is connected to the advanced polarizer film 24 through the adhesive layer 211. The polarizing plate of the embodiment reduces blue light damage by adjusting the polarizing plate structure and replacing the first supporting layer 231 under the polarizing layer 22 in prior art polarizing plate with the short wavelength band blue film 13 without adding another film. It realizes eye protection effect from short wavelength band blue light. Compared with other solution with an external anti-blue-ray glass, the polarizing plate of the invention effectively reduces the influence on the overall thickness of the polarizing plate. It has no obvious influence on the light transmission of other wavelength bands, and avoids decreasing of transmittance. It can greatly guarantee the display effect and avoid issue of display distortion. At the same time, compared with most of the current short wavelength band blue light products, the polarizing plate of the invention allows effective control of cost, has more usability, and is advantageous to for product promotion.

Figure 5:
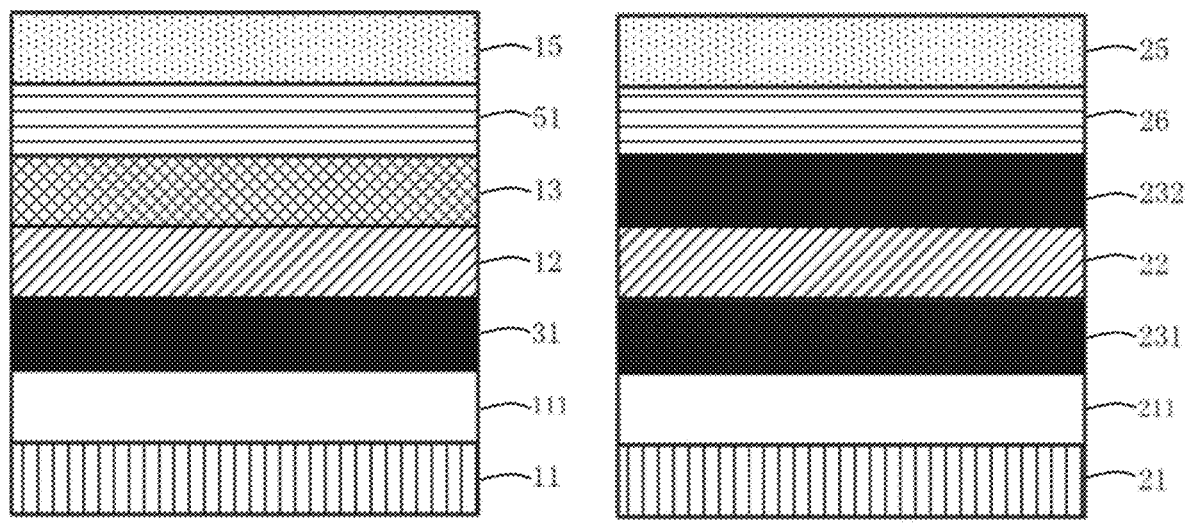
FIG. 5 is a schematic view of a laminated structure of a polarizing plate according to a fifth embodiment of the disclosure.

Referring to FIG. 5, FIG. 5 is a schematic view of a laminated structure of a polarizing plate according to a fifth embodiment of the invention. The left side of FIG. 5 is a schematic view of a laminated structure of the polarizing plate of the present invention, and the right side of FIG. 5 is a schematic view of a laminated structure of the prior art polarizing plate for comparing. The difference from the third embodiment shown in FIG. 3 is that, in the embodiment, there provides a surface treatment layer 51 disposed on the lower side of the protective film (replacing the advanced polarizer film 14 in FIG. 3 with the surface treatment layer 51). The polarizing plate in the embodiment includes a release film 11, a supporting layer 31, a polarizing layer 12, a short wavelength band blue light film 13, a surface treatment layer 51, and a protective film 15 stacked in order.

The release film 11 is disposed under the supporting layer 31. The release film 11 is connected to the supporting layer 31 through an adhesive layer 111 for isolating the polarizing layer 12 from external environment. When the supporting layer 31 is disposed on a lower side of the polarizing layer 12, the release film 11 is connected to the supporting layer 31 through an adhesive layer 111. Material of the adhesive layer 111 is PSAs.

The supporting layer 31 is disposed on a lower side of the polarizing layer 12 for isolating the polarizing layer 12 from water and gas to protect the polarizing layer 12. Material of the supporting layer 31 is TAC, COP, PMMA, or etc.

The polarizing layer 12 is configured to polarize the incident light and then emitting. Material of the polarizing layer is PVA or PVA-Ms.

The short wavelength band blue light film 13 is disposed directly on the polarizing layer 12 to filter blue light with harmful wavelength less than 455 nm to reduces the proportion of the short wavelength band blue light in blue light band. The embodiment realizes eye protection effect from short wavelength band blue light by adjusting the polarizing plate structure without adding another film.

The surface treatment layer 51 is disposed under the protective film 15. The surface treatment layer 51 is disposed above the short wavelength band blue light film 13 for surface treatment of the low-band blue film 13 to improve picture clarity. When the short wavelength band blue light film 13 is disposed directly on the polarizing layer 12, the surface treatment layer 51 is disposed above the short wavelength band blue light film 13. The surface treatment layer 51 is at least one of anti-glare (AG) layer, low reflection (LR) layer/anti-reflection (AR) layer, and hard coating (HC) layer.

The protective film 15 is disposed on the upper side of the polarizing layer 12. In detail, the protective film 15 is disposed on the upper side of the surface treatment layer 51 in this embodiment. The protective film has wear resistance, scratch resistance, and anti-reflective effect.

For comparing, a prior art polarizing plate includes a release film 21, a first supporting layer 231, a polarizing layer 22, a second supporting layer 232, a surface treatment layer 26, and a protective film 25 stacked in order. The release film 21 is connected to the first supporting layer 231 through an adhesive layer 211. The polarizing plate of the embodiment reduces blue light damage by adjusting the polarizing plate structure and replacing the second supporting layer 232 above the polarizing layer 22 in prior art polarizing plate with the short wavelength band blue film 13 without adding another film. It realizes eye protection effect from short wavelength band blue light. Compared with other solution with an external anti-blue-ray glass, the polarizing plate of the invention effectively reduces the influence on the overall thickness of the polarizing plate. It has no obvious influence on the light transmission of other wavelength bands, and avoids decreasing of transmittance. It can greatly guarantee the display effect and avoid issues of display distortion. At the same time, compared with most of the current short wavelength band blue light products, the polarizing plate of the invention allows effective control of cost, has more usability, and is advantageous to for product promotion.

Figure 6:
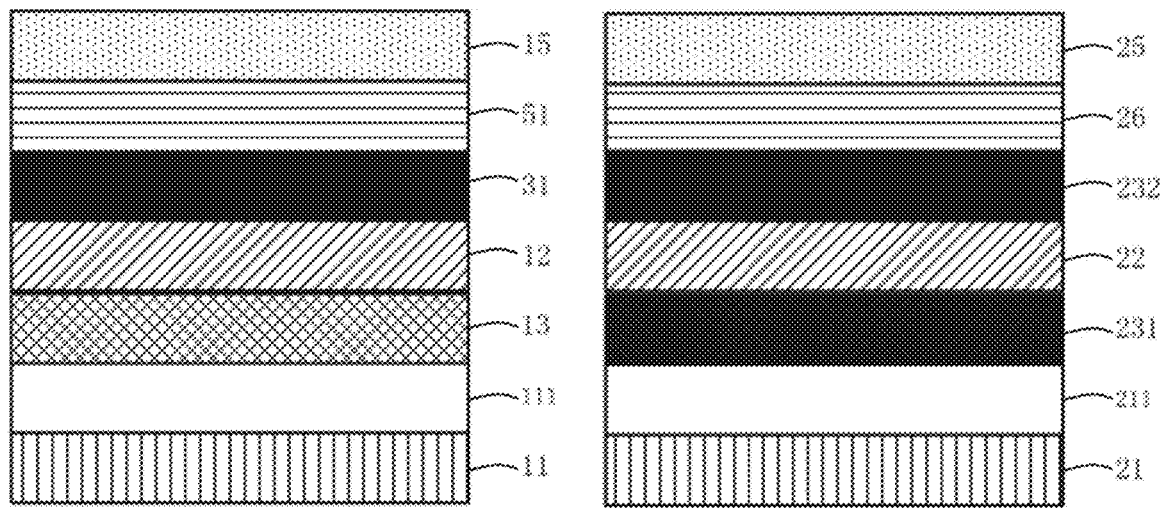
FIG. 6 is a schematic view of a laminated structure of a polarizing plate according to a sixth embodiment of the disclosure.

Referring to FIG. 6, FIG. 6 is a schematic view of a laminated structure of a polarizing plate according to a sixth embodiment of the invention. The left side of FIG. 6 is a schematic view of a laminated structure of the polarizing plate of the present invention, and the right side of FIG. 6 is a schematic view of a laminated structure of the prior art polarizing plate for comparing. The difference from the fifth embodiment shown in FIG. 5 is that, in the embodiment, there provides a short wavelength band blue light film 13 disposed directly under the polarizing layer, and a supporting layer 31 disposed the polarizing layer. The polarizing plate in the embodiment includes a release film 11, a short wavelength band blue light film 13, a polarizing layer 12, a supporting layer 31, a surface treatment layer 51, and a protective film 15 stacked in order.

The release film 11 is disposed under the short wavelength band blue light film 13. The release film 11 is bonded to the short wavelength band blue light film 13 through an adhesive layer 111 for isolating the polarizing layer 12 from external environment. When the short wavelength band blue light film 13 is disposed directly under the polarizing layer 12, the release film 11 is bonded to the short wavelength band blue light film 13 through an adhesive layer 111. Material of the adhesive layer 111 is PSAs.

The short wavelength band blue light film 13 is disposed directly under the polarizing layer 12 to filter blue light with harmful wavelength less than 455 nm to reduces the proportion of the short wavelength band blue light in blue light band. The embodiment realizes eye protection effect from short wavelength band blue light by adjusting the polarizing plate structure without adding another film.

The polarizing layer 12 is configured to polarize the incident light and then emitting. Material of the polarizing layer is PVA or PVA-Ms.

The supporting layer 31 is disposed on an upper side of the polarizing layer 12 for isolating the polarizing layer 12 from water and gas to protect the polarizing layer 12. Material of the supporting layer 31 is TAC, COP, PMMA, or etc.

The surface treatment layer 51 disposed on a lower side of the protective film 15. The surface treatment layer 51 is disposed on an upper side of the supporting layer 31 for surface treatment of the supporting layer 31 to improve picture clarity. When the supporting layer 31 is disposed on an upper side of the polarizing layer 12, the surface treatment layer 51 is disposed on an upper side of the supporting layer 31. The surface treatment layer 51 is at least one of AG layer, LR layer/AR layer, and HC layer.

The protective film 15 is disposed on the upper side of the polarizing layer 12. In detail, the protective film has wear resistance, scratch resistance, and anti-reflective effect.

For comparing, a prior art polarizing plate includes a release film 21, a first supporting layer 231, a polarizing layer 22, a second supporting layer 232, a surface treatment layer 26, and a protective film 25 stacked in order. The release film 21 is connected to the first supporting layer 231 through an adhesive layer 211. The polarizing plate of the embodiment reduces blue light damage by adjusting the polarizing plate structure and replacing the first supporting layer 231 under the polarizing layer 22 in prior art polarizing plate with the short wavelength band blue film 13 without adding another film. It realizes eye protection effect from short wavelength band blue light. Compared with other solution with an external anti-blue-ray glass, the polarizing plate of the invention effectively reduces the influence on the overall thickness of the polarizing plate. It has no obvious influence on the light transmission of other wavelength bands, and avoids decreasing of transmittance. It can greatly guarantee the display effect and avoid issues of display distortion. At the same time, compared with most of the current short wavelength band blue light products, the polarizing plate of the invention allows effective control of cost, has more usability, and is advantageous to product promotion.

Figure 7:
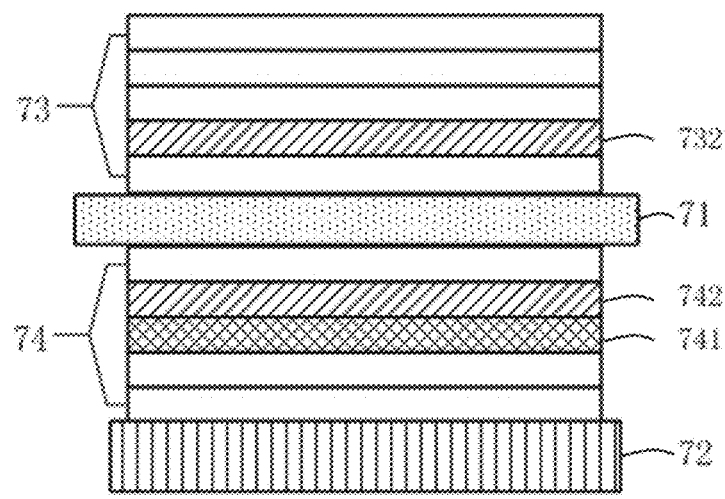
FIG. 7 is a schematic view of a laminated structure of a liquid crystal display device according to an embodiment of the disclosure.

Referring to FIG. 7, FIG. 7 is a schematic view of a laminated structure of a liquid crystal display device according to an embodiment of the invention. The liquid crystal display device includes a liquid crystal display panel 71 and a backlight module 72. The backlight module 72 is disposed on a lower side of the liquid crystal display panel 71. The liquid crystal display device further includes a first polarizing plate 73 disposed on the liquid display panel 71, and a second polarizing plate 74 disposed between the liquid crystal display panel 71 and the backlight module 72. At least one of the first polarizing plate 73 and the second polarizing plate 74 applies the polarizing plate according any one of the first embodiment to the sixth embodiment. At least one of the polarizing plates of the embodiment reduces blue light damage by adjusting the polarizing plate structure and replacing the supporting layer above or under the polarizing layer in prior art polarizing plate with the short wavelength band blue film. It realizes eye protection effect from short wavelength band blue light. Compared with other solution with an external anti-blue-ray glass, the polarizing plate of the invention effectively reduces the influence on the overall thickness of the polarizing plate. It has no obvious influence on the light transmission of other wavelength bands, and avoids decreasing of transmittance. It can greatly guarantee the display effect and avoid issues of display distortion. At the same time, compared with most of the current short wavelength band blue light products, the polarizing plate of the invention allows effective control of cost, has more usability, and is advantageous to product promotion.

In detail, the liquid crystal display panel 71 includes a thin film transistor (TFT) array substrate, a color filter (CF) substrate, and a liquid crystal layer (LCL) disposed between the array substrate and the color filter substrate. The first polarizing plate 73 is disposed on a side of the CF substrate opposite another side of the CF substrate facing the liquid crystal layer. The second polarizing plate 74 is disposed on a side of the array substrate opposite another side of the array substrate facing the liquid crystal layer. The backlight module 72 is disposed on a side of the array substrate opposite another side of the array substrate facing the liquid crystal layer. The backlight module includes light emitting diodes (LEDs) as a backlight source.

Preferably, the second polarizing plate 74 is a polarizing plate according to any one of the first to sixth embodiments of the present invention. That is, a polarizing plate having a short wavelength band blue light film provided by the present invention is applied as a lower polarizing plate between the backlight module 72 and the array substrate. The reflection effect of the short wavelength band blue light film is smaller in such a configuration.

Preferably, the second polarizing plate 74 is a polarizing plate according to any one of the second, fourth, or sixth embodiments of the present invention. That is, a polarizing plate having a short wavelength band blue light film provided by the present invention is applied as a lower polarizing plate between the backlight module 72 and the array substrate. To the polarizing plate with the short wavelength band blue light film, the short wavelength band blue light film 741 is disposed on a lower side of a polarizing layer 742 of the second polarizing plate 74. By disposing the short wavelength band blue light film between the polarizing layer of the lower polarizing plate and the backlight module, harmful blue light generated by the backlight LED of the backlight module and reflected by the backlight module passes through the short wavelength band blue light film of the polarizing plate to absorb harmful portion of the harmful blue light and to display normally through the liquid crystal display panel. The polarization effect of the two polarizing layers of the upper and lower polarizing plates (the polarizing layer 742 of the second polarizing plate 74 and the polarizing layer 732 of the first polarizing plate 73) can further avoid the reflected light from the short wavelength band blue light film, and effectively reduce the reflection effect of the short wavelength band blue light film.

Figure 8A:
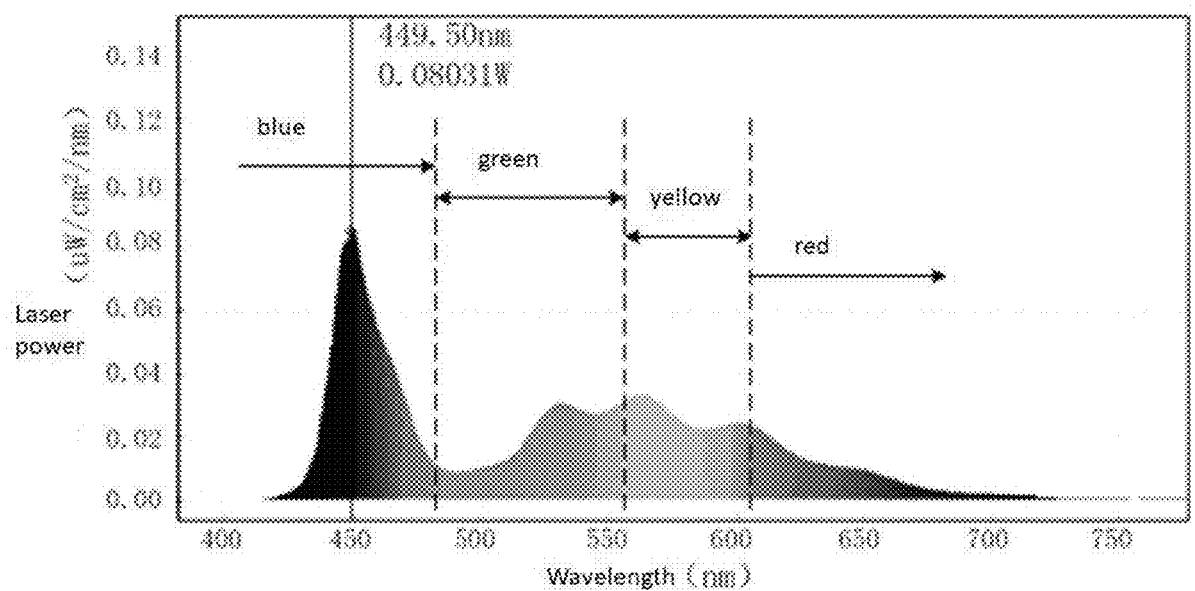
FIG. 8A is a transmission spectrum of a polarizing plate according to an embodiment of the disclosure with a light emitting diode (LED) backlight.
Figure 8B:
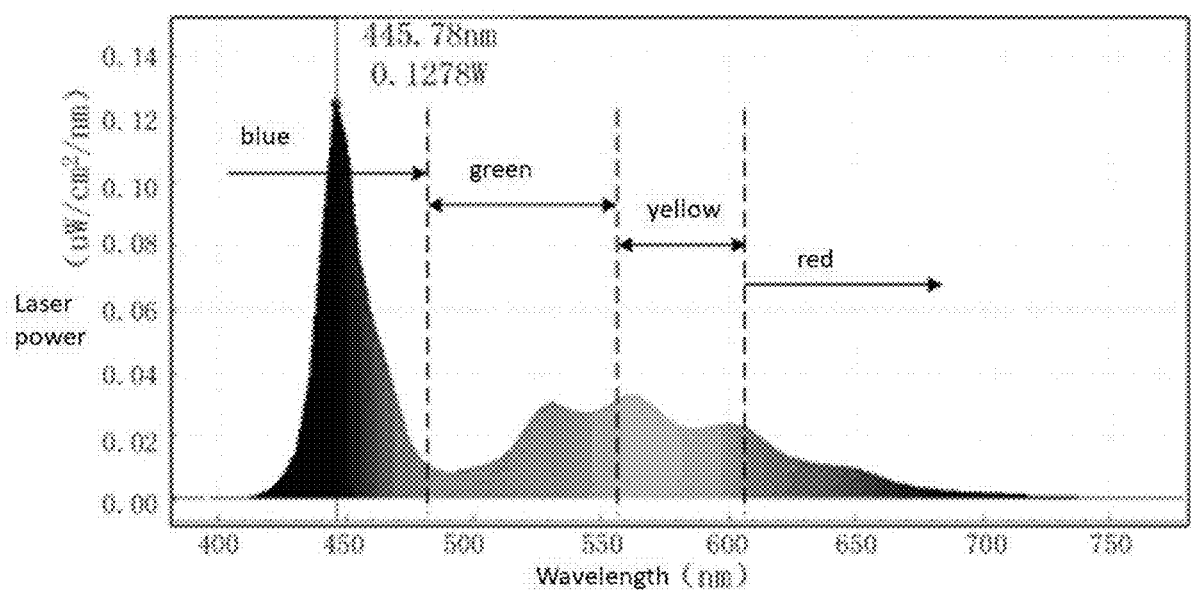
FIG. 8B is a transmission spectrum of a polarizing plate according to prior art with an LED backlight.

Referring to FIGS. 8A and 8B, FIG. 8A shows a transmission spectrum of the polarizing plate of the present invention with an LED backlight. FIG. 8B shows a transmission spectrum of a polarizing plate of the prior art with the LED backlight. Only some type of light (blue light, green light, yellow light, and red light) and approximate corresponding band ranges are marked in the figure. The short wavelength band blue light film in the polarizing plate of the present invention adopts a short wavelength band blue light film produced by China Jinzhang Technology. One can find that the polarizing plate of the present invention can reduce the harmful blue light by 10% to 50%, and has no significant influence on the transmission of light in other bands by comparing FIG. 8A with FIG. 8B.

The present disclosure has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A polarizing plate, wherein the polarizing plate comprises:
    a polarizing layer, wherein a material of the polarizing layer is polyvinyl alcohol or cross-linked polyvinyl alcohol microspheres;
    a short wavelength band blue light film disposed directly on or disposed directly under the polarizing layer, wherein a short wavelength band blue light is defined as a blue light having a wavelength less than 455 nm;
    a supporting layer disposed on a side of the polarizing layer away from the short wavelength band blue light film, wherein a material of the supporting layer is a tri-acetic acid cellulose or a cyclo olefin polymer;
    a release film disposed under the polarizing layer, wherein the release film is bonded to the polarizing layer or the short wavelength band blue light film through an adhesive layer, and a material of the adhesive layer is a pressure sensitive adhesive; and
    a protective film disposed above the polarizing layer.

2. The polarizing plate according to claim 1, further comprising an advanced polarizer film disposed under the protective film, wherein the advanced polarizer film is bonded to the short wavelength band blue light film through the adhesive layer in a configuration that the short wavelength band blue light film is disposed directly on the polarizing layer and the supporting layer is disposed under on the polarizing layer, or the advanced polarizer film is bonded to the supporting layer through an adhesive layer in another configuration that the short wavelength band blue light film is disposed directly under the polarizing layer and the supporting layer is disposed on the polarizing layer.

3. The polarizing plate according to claim 1, further comprising a surface treatment layer disposed under the protective film, wherein the surface treatment layer is disposed above the short wavelength band blue light film in a configuration that the short wavelength band blue light film is disposed directly on the polarizing layer, or the surface treatment layer is disposed above the supporting layer in another configuration that the supporting layer is disposed on the polarizing layer.

4. The polarizing plate according to claim 3, wherein the surface treatment layer is at least one of a surface anti-glare layer, a surface low reflection layer/surface non-reflection layer, and a surface hardened layer.

5. A polarizing plate, comprising:
    a polarizing layer;
    a short wavelength band blue light film disposed directly on or disposed directly under the polarizing layer, wherein a short wavelength band blue light is defined as a blue light having a wavelength less than 455 nm;
    a release film disposed under the polarizing layer, the release film being bonded to the polarizing layer or the short wavelength band blue light film through an adhesive layer; and
    a protective film disposed above the polarizing layer.

6. The polarizing plate according to claim 5, wherein a material of the polarizing layer is polyvinyl alcohol or cross-linked polyvinyl alcohol microspheres.

7. The polarizing plate according to claim 5, wherein a material of the adhesive layer is a pressure sensitive adhesive.

8. The polarizing plate according to claim 5, wherein a material of the polarizing layer is polyvinyl alcohol or cross-linked polyvinyl alcohol microspheres.

9. The polarizing plate of claim 5, further comprising a supporting layer disposed on a side of the polarizing layer away from the short wavelength band blue light film.

10. The polarizing plate according to claim 9, wherein a material of the supporting layer is tri-acetic acid cellulose or a cyclo olefin polymers.

11. The polarizing plate according to claim 9, further comprising an advanced polarizer film disposed under the protective film, wherein the advanced polarizer film is bonded to the short wavelength band blue light film through the adhesive layer in a configuration that the short wavelength band blue light film is disposed directly on the polarizing layer and the supporting layer is disposed under the polarizing layer, or the advanced polarizer film is bonded to the supporting layer through the adhesive layer in another configuration that the short wavelength band blue light film is disposed directly under the polarizing layer and the supporting layer is disposed on the polarizing layer.

12. The polarizing plate according to claim 9, further comprising a surface treatment layer disposed under the protective film, wherein the surface treatment layer is disposed above the short wavelength band blue light film in a configuration that the short wavelength band blue light film is disposed directly on the polarizing layer, or the surface treatment layer is disposed above the supporting layer in another configuration that the supporting layer is disposed on the polarizing layer, wherein the surface treatment layer is at least one of a surface anti-glare layer, a surface low reflection layer/surface non-reflection layer, and a surface hardened layer.

13. A liquid crystal display device comprising a liquid crystal display panel and a backlight module, wherein the liquid crystal display panel comprises an array substrate, a color filter substrate, and a liquid crystal layer disposed between the array substrate and the color filter substrate, wherein the backlight module is disposed on a side of the array substrate away from the liquid crystal layer, wherein the liquid crystal display device further comprises:
    a first polarizing plate disposed on a side of the color filter substrate away from the liquid crystal layer; and
    a second polarizing plate disposed between the array substrate and the backlight module, wherein at least one of the first polarizing plate and the second polarizing plate comprises:
    a polarizing layer;
    a short wavelength band blue light film disposed directly on or disposed directly under the polarizing layer, wherein a short wavelength band blue light is defined as a blue light having a wavelength less than 455 nm;

a release film disposed under the polarizing layer, wherein the release film is bonded to the polarizing layer or the short wavelength band blue light film through an adhesive layer; and a protective film disposed above the polarizing layer.

14. The liquid crystal display device according to claim 13, wherein a material of the polarizing layer is polyvinyl alcohol or cross-linked polyvinyl alcohol microspheres.

15. The liquid crystal display device of claim 13, wherein a material of the adhesive layer is a pressure sensitive adhesive.

16. The liquid crystal display device of claim 13, wherein the polarizing plate further comprises an advanced polarizer film disposed under the protective film, wherein the advanced polarizer film is bonded to the short wavelength band blue light film through the adhesive layer in a configuration that the short wavelength band blue light film is disposed directly on the polarizing layer, or the advanced polarizer film is bonded to the polarizing layer through the adhesive layer in another configuration that the short wavelength band blue light film is disposed directly under the polarizing layer.

17. The liquid crystal display device of claim 13, wherein the polarizing plate further comprises a supporting layer disposed on a side of the polarizing layer away from the short wavelength band blue light film.

18. The liquid crystal display device of claim 17, wherein a material of the supporting layer is tri-acetic acid cellulose or a cyclo olefin polymers.

19. The liquid crystal display device of claim 17, wherein the polarizing plate further comprises an advanced polarizer film disposed under the protective film, wherein the advanced polarizer film is bonded to the short wavelength band blue light film through the adhesive layer in a configuration that the short wavelength band blue light film is disposed directly on the polarizing layer and the supporting layer is disposed under the polarizing layer, or the advanced polarizer film is bonded to the supporting layer through the adhesive layer in another configuration that the short wavelength band blue light film is disposed directly under the polarizing layer and the supporting layer is disposed on the polarizing layer.

20. The liquid crystal display device of claim 17, wherein the polarizing plate further comprises a surface treatment layer disposed under the protective film, wherein the surface treatment layer is disposed above the short wavelength band blue light film in a configuration that the short wavelength band blue light film is disposed directly on the polarizing layer, or the surface treatment layer is disposed above the supporting layer in another configuration that the supporting layer is disposed on the polarizing layer, wherein the surface treatment layer is at least one of a surface anti-glare layer, a surface low reflection layer/surface non-reflection layer, and a surface hardened layer.

* * * * *